(12) United States Patent
Martin et al.

(10) Patent No.: US 7,970,365 B2
(45) Date of Patent: Jun. 28, 2011

(54) SYSTEMS AND METHODS FOR COMPENSATING FOR TRANSMISSION PHASING ERRORS IN A COMMUNICATIONS SYSTEM USING A RECEIVE SIGNAL

(75) Inventors: G. Patrick Martin, Merritt Island, FL (US); Kathleen Minear, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 485 days.

(21) Appl. No.: 12/273,935

(22) Filed: Nov. 19, 2008

(65) Prior Publication Data

US 2010/0124895 A1 May 20, 2010

(51) Int. Cl.
*H04B 1/04* (2006.01)
*H04B 7/00* (2006.01)
*H04B 7/24* (2006.01)
*H04B 7/26* (2006.01)

(52) U.S. Cl. ............... 455/129; 455/272; 342/350

(58) Field of Classification Search ............... 455/129, 455/269, 272, 276.1; 342/350, 368, 378
See application file for complete search history.

(56) References Cited

U.S. PATENT DOCUMENTS

| | | | |
|---|---|---|---|
| 3,646,558 A | 2/1972 | Campanella | |
| 3,697,997 A | 10/1972 | Cooper | |
| 3,961,172 A | 6/1976 | Hutcheon | |
| 4,060,809 A | 11/1977 | Baghdady | |
| 4,358,822 A | 11/1982 | Sanchez | |
| 4,532,518 A | 7/1985 | Gaglione et al. | |
| 4,843,397 A | 6/1989 | Galati et al. | |
| 4,862,180 A | 8/1989 | Martin | |
| 5,008,680 A | 4/1991 | Willey et al. | |
| 5,157,404 A | 10/1992 | Rowe et al. | |
| 5,313,308 A | 5/1994 | Hasegawa et al. | |
| 5,541,607 A | 7/1996 | Reinhardt | |
| 5,805,983 A | 9/1998 | Naidu et al. | |
| 6,002,360 A | 12/1999 | Wolcott et al. | |

(Continued)

FOREIGN PATENT DOCUMENTS

EP 0 959 522 A1 11/1999

(Continued)

OTHER PUBLICATIONS

Li, Y., et al., "Adaptive Blind Source Separation and Equalization for Multiple-Input/Multiple-Output Systems" IEEE Transactions on Information Theory, vol. 44, No. 7, Nov. 1998.

(Continued)

*Primary Examiner* — David Mis
(74) *Attorney, Agent, or Firm* — Fox Rothschild, LLP; Robert J. Sacco

(57) ABSTRACT

A method for correcting transmission phasing errors in an plurality of antenna elements is provided. The method includes receiving at least a first signal having a first frequency at the plurality of antenna elements at an angle of arrival (AOA). The method also includes identifying an actual fractional wavelength value ($f_{true}$) for the first signal received with respect to a reference location for at least one of the plurality of antenna elements, obtaining a estimated phase propagation of the first signal at the one of the plurality of antenna elements relative to the reference location based at least on configuration data for plurality of antenna elements, and updating the configuration data associated with the AOA for the one of the plurality of antenna elements based on the estimated phase propagation and $f_{true}$.

25 Claims, 8 Drawing Sheets

U.S. PATENT DOCUMENTS

| | | | |
|---|---|---|---|
| 6,075,484 A | 6/2000 | Daniel et al. | |
| 6,480,153 B1 | 11/2002 | Jung et al. | |
| 6,525,685 B1 * | 2/2003 | Rose | 342/148 |
| 6,597,730 B1 | 7/2003 | Bader | |
| 6,816,822 B1 | 11/2004 | Hess et al. | |
| 6,826,521 B1 | 11/2004 | Hess et al. | |
| 6,861,975 B1 | 3/2005 | Coleman, Jr. et al. | |
| 6,897,807 B2 | 5/2005 | Kishigami et al. | |
| 6,975,268 B2 | 12/2005 | Coleman et al. | |
| 7,057,555 B2 | 6/2006 | Lewis | |
| 7,705,779 B2 | 4/2010 | Goldberg et al. | |
| 2002/0126045 A1 | 9/2002 | Kishigami et al. | |
| 2002/0196186 A1 | 12/2002 | Holt et al. | |
| 2003/0236081 A1 | 12/2003 | Braun | |
| 2004/0169602 A1 | 9/2004 | Hamada et al. | |
| 2006/0109927 A1 | 5/2006 | Magee et al. | |
| 2007/0078530 A1 | 4/2007 | Blevins et al. | |
| 2007/0168057 A1 | 7/2007 | Blevins et al. | |
| 2008/0129613 A1 | 6/2008 | Ermutlu et al. | |
| 2009/0167607 A1 | 7/2009 | Holder | |
| 2010/0123618 A1 | 5/2010 | Martin et al. | |
| 2010/0123624 A1 | 5/2010 | Minear et al. | |
| 2010/0123625 A1 | 5/2010 | Martin et al. | |
| 2010/0125347 A1 | 5/2010 | Martin et al. | |

FOREIGN PATENT DOCUMENTS

| | | |
|---|---|---|
| EP | 1 271 802 A1 | 1/2003 |
| WO | WO 01/65637 A2 | 9/2001 |
| WO | WO 2007/001252 A1 | 1/2007 |
| WO | WO 2008/074925 A1 | 6/2008 |

OTHER PUBLICATIONS

Qin, S., et al., "A Survey of Industrial Model Predictive Control Technology" Control Engineering Practice, Pergamon Press, Oxford, GB, vol. 11, Jan. 1, 2003, pp. 733-764.

Maneri, E., et al., "LQG Controller Design Using GUI: Application to Antennas and Radio-Telescopes" IS Transactions, Instrument Society of America, Pittsburgh, US, vol. 39, No. 2, Apr. 1, 2000, pp. 243-264.

Gawronski, W., Control and Pointing Challenges of Large Antennas and Telescopes: IEEE Transactions on Control Systems Technology, IEEE Service Center, New York, NY, US, vol. 15, No. 2, Mar. 1, 2007, pp. 276-289.

* cited by examiner

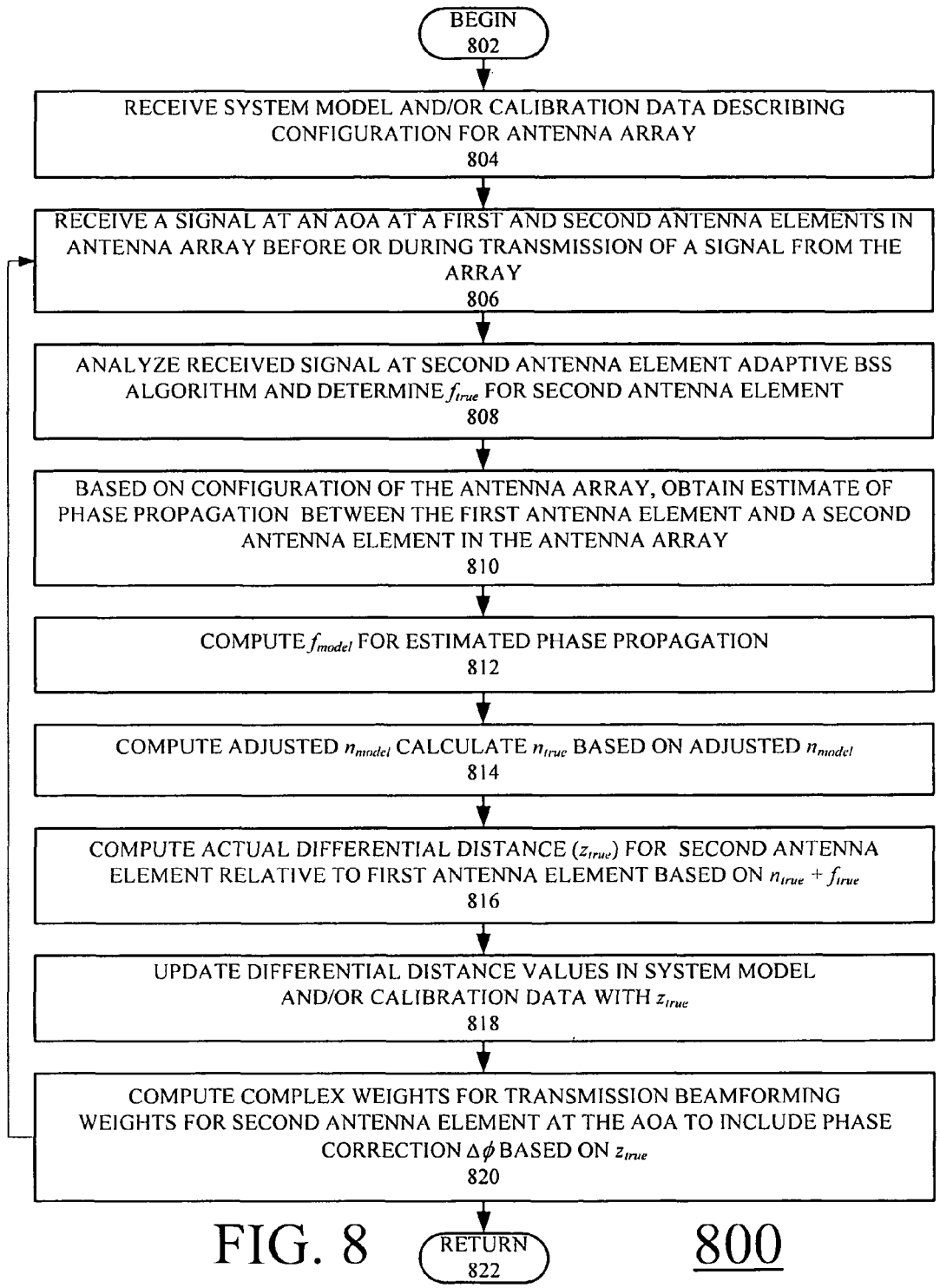
FIG. 8    800

SYSTEMS AND METHODS FOR COMPENSATING FOR TRANSMISSION PHASING ERRORS IN A COMMUNICATIONS SYSTEM USING A RECEIVE SIGNAL

BACKGROUND OF THE INVENTION

1. Statement of the Technical Field

The invention concerns communication systems. More particularly, the invention concerns systems and methods for compensating for transmission phasing errors in communication systems using a receive signal.

2. Description of the Related Art

Multiple element antenna arrays are widely used in wireless communications systems to enhance the transmission and reception of signals. In particular, the enhanced performance is generally provided by using such antenna arrays in conjunction with beamforming techniques. Conventional beamforming takes advantage of interference between electromagnetic waves generated by each of the different antenna elements in the antenna array to change the overall directionality for the array. For example, during transmission, the phase and relative amplitude of the transmitted signal at each antenna element is adjusted, in order to create a desired pattern of constructive and destructive interference at the wavefront of the transmitted signal. During signal reception, the received signals are processed and the different antenna elements are arranged in such a way that a pre-defined pattern of radiation is preferentially observed by the antenna elements.

In general, such antenna arrays typically include a system controller, a plurality of antenna controllers, and a plurality of antenna elements (e.g., dish antennas). Each of the antenna elements is typically communicatively coupled to the system controller and a respective one of the antenna controllers via cables. During transmission and reception, each antenna element converts electrical signals into electromagnetic waves and vice versa. The system controller, using conventional beamforming techniques, varies the configuration of the various components in the antenna array to provide a particular radiation pattern during transmission or reception. However, as the dimensions of the array, the number of antenna elements, and the precision required in certain beamforming applications increases, properly concerting the actions of the various components becomes increasingly difficult.

SUMMARY OF THE INVENTION

Embodiments of the present invention provide systems and methods for compensating for transmission phasing errors in communication systems using a receive signal.

In a first embodiment of the present invention, a method for correcting transmission phasing errors in an plurality of antenna elements is provided. The method includes the steps of: receiving at least a first signal having a first frequency at the plurality of antenna elements at an angle of arrival (AOA). The method also includes identifying an actual fractional wavelength value ($f_{true}$) for the first signal received with respect to a reference location for at least one of the plurality of antenna elements; obtaining a estimated phase propagation of the first signal at the one of the plurality of antenna elements relative to the reference location based at least on configuration data for plurality of antenna elements; and updating the configuration data associated with the AOA for the one of the plurality of antenna elements based on the estimated phase propagation and $f_{true}$.

In a second embodiment of the present invention, a communication system is provided. The communications system includes a plurality of antenna elements and an array control system communicatively coupled to the plurality of antenna elements. The array control system includes a storage element for storing signal data for at least a first signal having a first frequency received at the plurality of antenna elements at an angle of arrival (AOA) and for storing configuration data for the plurality of antenna elements. The array control system also includes a processing element communicatively coupled to the storage element. The processing element configured for: identifying an actual fractional wavelength value ($f_{true}$) for at least one of the plurality of antenna element for the first signal with respect to a reference location, obtaining a estimated phase propagation of the first signal at the one of the plurality of antenna elements relative to the reference location based at least on configuration data for plurality of antenna elements, and updating the configuration data associated with the AOA for the one of the plurality of antenna elements based on the estimated phase propagation and $f_{true}$.

In a third embodiment of the present invention, a computer-readable storage, having stored thereon a computer program for correcting transmission phasing errors in plurality of antenna is provided. The computer program includes a plurality of code sections for performing the steps of: receiving signal data for at least a first signal having a first frequency at the plurality of antenna elements at an angle of arrival (AOA), identifying an actual fractional wavelength value ($f_{true}$) for the first signal received with respect to a reference location for at least one of the plurality of antenna elements using a blind source separation algorithm; obtaining a estimated phase propagation of the first signal at the one of the plurality of antenna elements relative to the reference location based at least on configuration data for plurality of antenna elements; and updating the configuration data associated with the AOA for the one of the plurality of antenna elements based on the estimated phase propagation and $f_{true}$

BRIEF DESCRIPTION OF THE DRAWINGS

Embodiments will be described with reference to the following drawing figures, in which like numerals represent like items throughout the figures, and in which:

FIG. 8 is a flowchart of steps in an exemplary method for operating an array of antenna element according to an embodiment of the present invention.

DETAILED DESCRIPTION

Figure 1:
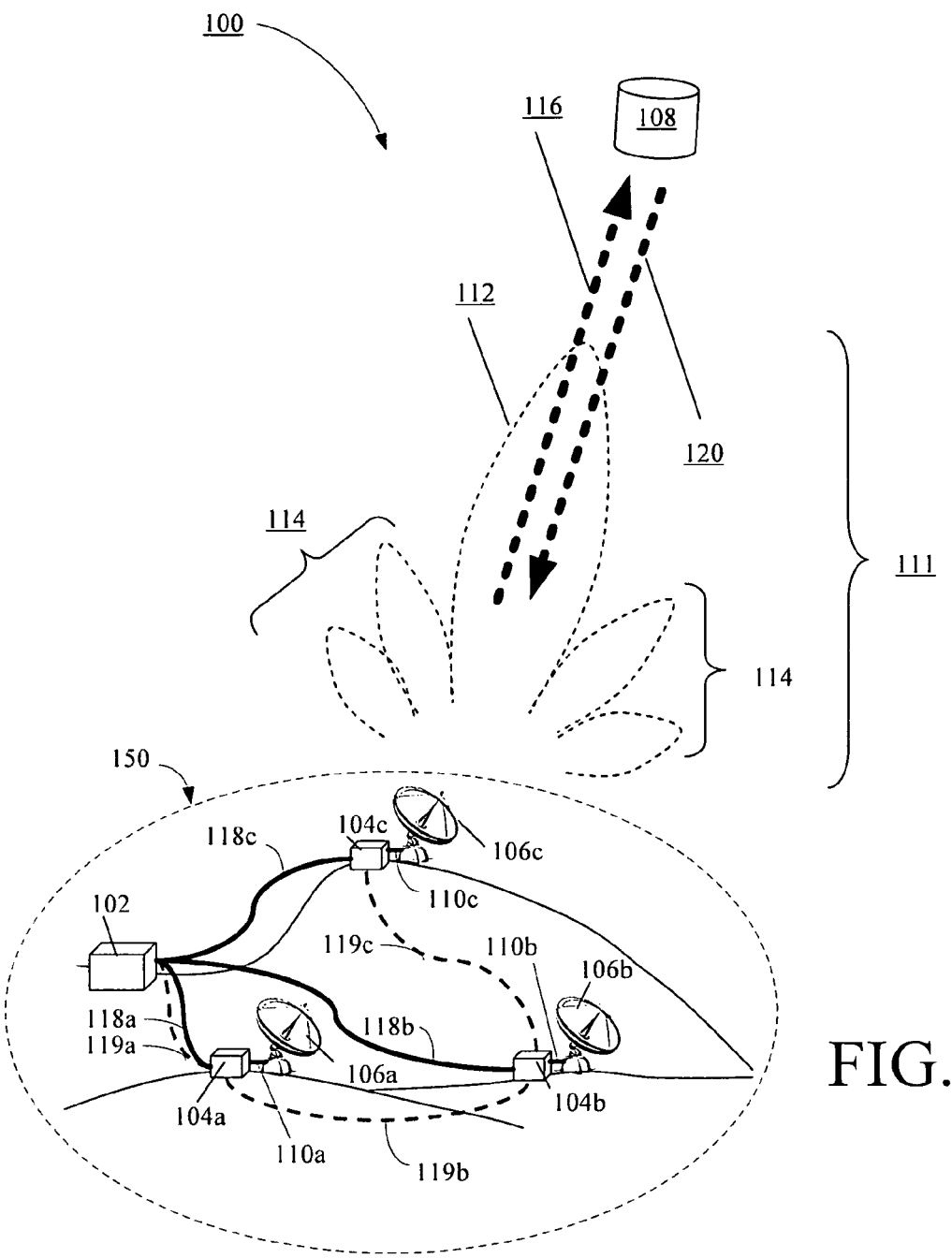
FIG. 1 is a schematic illustration of an exemplary communications system configured according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Multi-element antenna arrays are commonly used for providing directional wireless communications by utilizing various beamforming techniques. That is, the antenna element array is typically configured to receive or transmit in one or more directions via adjustment of antenna element position, antenna element signal amplitude, and/or antenna element signal phase. The resulting interference pattern provides a series of directional beams and nulls which are used to accept and ignore signals, respectively, during transmission or reception tasks. Typically, the beamforming is performed by using a pre-defined system model and/or calibration data that describes the configuration of the antenna array to determine how to adjust the antenna elements to provide enhanced transmission and reception of signals from one or more sources.

However, one of the difficulties with beamforming techniques is that such pre-defined system models generally assume ideal transmission conditions in the transmission medium (e.g., air, space) and perfect alignment of the antenna elements. That is, it is generally assumed that the phase of a signal transmitted by the different antenna elements and the locations of the antenna elements in the array are accurately known and that directional beams and nulls generated by the signals from each antenna element occur at the locations specified by the model. Unfortunately, this is generally not the case for most multi-element antenna arrays, especially when the antenna elements are spread out over a large distance.

Typically, the signals transmitted by one or more antenna elements in a multi-element antenna suffer from some amount of phasing error due to objects in the transmission medium and slight errors in the locations of the antenna elements. For example, objects such as clouds and other atmospheric effects can affect the phase of the signal being transmitted and the locations of the antenna element may not be known with a high degree of accuracy. Since beamforming relies on phase coordination of the signals generated by the various antenna element in an array, based on the locations of the antenna elements, such phasing errors can result in reduced signal strength at the target object or even formation of a null.

In the case of antenna elements transmitting and receiving at the same frequency, such phasing errors are generally corrected during a transmission operation by using the complex conjugate of the phase of the as-received signal to adjust the phase of the transmitted signal. This is possible since the phase propagation is essentially the same for the transmitted and received signal and needs only to be synchronized the correct phase. The term "phase propagation", as used herein, refers to the variation in phase of a signal over time and distance. Typically, as a signal traverses a transmission medium, the phase of the signal varies according to the frequency of the signal. Unfortunately, in many types of multi-element antenna systems, the transmitted and received signals may not have the same frequency. As a result, the phase propagation for these transmitted and received signals varies and the complex conjugate of the phase of the received signal cannot be applied.

As a result, in other to determine the amount of transmission phasing errors, so-called "long loop" methods are typically used. That is, an antenna element is configured to transmit a initial signal towards a reference object, which will produce a return signal directed back towards the antenna element. Afterwards, based on the time elapsed between transmission of the initial signal, reception of the return signal, and known delays at the reference object, the phase center location for the antenna element can be ascertained. However, such methods are not without problems. First, signal latency can result in a time consuming calibration process. For example, if calibration data is being obtained between somewhat distant objects, such as Earth and Mars, the elapsed time between transmission and reception can be at least on the order of tens of minutes. If such a task is performed individually for a large array of multiple antenna elements, a calibration process can take hours, if not days. Second, even if closer reference objects are utilized to minimize signal latency, visibility is still generally an issue. For example, if the calibration data is acquired using signals transmitted between the Earth and the Moon, availability is a problem. In particular, since the Moon is available for approximately only 12 hours a day, calibrations can only be performed during limited time windows. Third, even if the reference object is available 24 hours a day, off-task alignment is an issue. That is, since the reference object may not be in the direction of the object of interest for the antenna array, the antenna array will generally need to terminate a current task and go into a calibration mode that points the antenna array away from the object of interest. As a result, the antenna array is generally unavailable for communications and/or measurement task during this calibration mode.

To overcome the various limitations of conventional multi-element antenna array communications systems, embodiments of the present invention provide systems and methods for adjusting the phase of transmitted signals to correct for such phasing errors. In particular, the various embodiments of the present invention provide systems and methods for computing a phase correction for a transmitted signal at an antenna element based on signals received by the array of antenna elements from one or more radiometric sources. The received signals can be used to compute a differential distance for the antenna element relative to a reference antenna element to determine the amount of phase correct needed. Since both signals from radiometric sources can be received and the phase corrections can be computed during transmission, such systems and method provide significant advantages over than long loop methods by reducing or eliminating latency issues and availability. Furthermore, such phase corrections can be computed based on a received signal at the same or different frequency as the frequency of transmission.

Although the various embodiments of the present invention will be described with respect to an exemplary embodiment, the present invention is not limited in this regard. Accordingly, the present invention can take the form as an entirely hardware embodiment, an entirely software embodiment, or any combination thereof.

Exemplary Communications System

FIG. 1 shows an exemplary communications system 100 configured according to an embodiment of the present invention. As shown in FIG. 1, the communication system 100 comprises a multi-element antenna system (MEAS) 150 for transmitting signals to and receiving signals from at least one object of interest 108 remotely located from the multi-element antenna system. In FIG. 1, the object of interest 108 is shown as airborne or space borne object, such as an aircraft, spacecraft, a natural or artificial satellite, or a celestial object (e.g., planets, moons, asteroids, comets, etc. . . . ). However, the present invention is not limited in this regard and the MEAS 150 can also be used for transmitting and receiving signals from an object of interest 108 that is not airborne or space borne but is still remotely located with respect the MEAS 150. For example, a ground-based MEAS 150 can be used to provide communications with objects of interest 108 at other ground-based or sea-based locations. The MEAS 150 can generally include an array control system (ACS) 102 for controlling the operation of multiple antenna elements.

In FIG. 1, the ACS 102 is shown as controlling the operation of antenna elements 106a, 106b, 106c and associated RF equipment 104a, 104b, 104c. The antenna elements 106a, 106b, 106c provide wireless communications. For example, if the MEAS 150 is in a transmit mode, then each antenna element 106a, 106b, 106c converts electrical signals into electromagnetic waves. The radiation pattern 111 resulting from the interference of the electromagnetic waves transmitted by the different antenna elements 106a, 106b, 106c can then be adjusted to provide a central beam 112 in the radiation pattern 111 aimed in a direction 116 of the object of interest 108. The radiation pattern 111 of the antenna elements 106a, 106b, 106c also generates smaller side beams (or side lobes) 114 pointing in other directions with respect the direction of the central beam 112. However, because of the relative difference in magnitude between the side beams 114 and the central beam 112, the radiation pattern preferentially transmits the signal in the direction of the central beam 112. Therefore, by varying the phases and the amplitudes of the signals transmitted by each of antenna elements 106a, 106b, and 106c, the magnitude and direction of the central beam 112 can be adjusted. If the MEAS 150 is in a receive mode, then each of antenna elements 106a, 106b, and 106c captures energy from passing waves propagated over transmission media (e.g., air or space) in the direction 120 and converts the captured energy to electrical signals. In the receive mode, the MEAS 150 can be configured to combined the electrical signals according to the radiation pattern 111 to improve reception from direction 120, as described below.

In FIG. 1, the antenna elements 106a, 106b, and 106c are shown as reflector-type (e.g., dish) antenna elements, which generally allow adjustment of azimuth (i.e., lateral or side-to-side angle) and elevation (angle with respect to a local horizontal reference plane). Therefore, in addition to adjustment of phase and amplitude of the signal transmitted by each of antenna elements 106, the azimuth and elevation of each of antenna elements 106a, 106b, and 106c can also be used to further steer the central beam 112 and to further adjust the radiation pattern 111. However, the present invention is not limited in this regard and antenna elements 106 can comprise either directional or omni-directional antenna elements.

Although three (3) antenna elements 106a, 106b, 106c are shown in FIG. 1, the various embodiments of the present invention are not limited in this regard. Any number of antenna elements can be used without limitation. Furthermore, the spacing between the antenna elements 106a, 106b, and 106c with respect to each other can vary. Accordingly, the antenna elements 106a, 106b, and 106c can be widely or closely spaced to form an MEAS 150 that has a width of up to several kilometers. The antenna elements 106a, 106b, 106c can also be regularly spaced (not shown) with respect to one another to form a two dimensional (2D) grid of antenna elements or arbitrarily spaced (or non-linearly spaced) with respect to one another (as shown in FIG. 1) to form a three dimensional (3D) irregular array of antenna elements. As shown in FIG. 1, an arbitrary spacing for the antenna elements 106a, 106b, 106c can include providing varying elevation as well as varying lateral spacing between the antenna elements 106a, 106b, 106c.

As shown in FIG. 1, each of antenna elements 106a, 106b, 106c is communicatively coupled to a respective RF equipment 104a, 104b, 104c via a respective cable assembly 110a, 110b, 110c (collectively 110). Each of the cable assemblies 110a, 110b, 110c can have the same or different lengths. As used herein, the term "cable assembly" refers to any number of cables provided for interconnecting two different components. In the various embodiments of the present invention, the cables in the cable assembly can be bundled or unbundled.

The RF equipment 104a, 104b, 104c control the antenna elements 106a, 106b, 106c, respectively. For example, the RF equipment 104a, 104b, 104c can include hardware entities for processing transmit signals and receive signals. The RF equipment 104a, 104b, 104c will be described in more detail below in relation to FIGS. 3-4. Additionally, for directional antenna elements, as shown in FIG. 1, the RF equipment 104a, 104b, 104c are configured to provide control signals for control antenna motors (not shown), antenna servo motors (not shown), and antenna rotators (not shown) in antenna elements 106a, 106b, 106c to provide, for example, azimuth and elevation control.

As shown in FIG. 1, each of the RF equipment 104a, 104b, and 104c is communicatively coupled to the ACS 102 via a respective communications links 118a, 118b, 118c. Generally such communications links are provided via a cable assembly, however the present invention is not limited in this regard. In the various embodiments of the present invention, communications links 118 can comprise wire line, or optical, or wireless communications links. The cable assemblies for the communications links 118a, 118b, 118c can have the same or different lengths. Furthermore, although the communications links 118a, 118b, and 118c are shown to be arranged to couple the RF equipment 104 to the ACS 102 in parallel, in other embodiments of the present invention, they can be connected in a series arrangement, such as that shown by communications links 119a, 119b, and 119c.

In operation, the ACS 102 modulates signals to be transmitted by the antenna elements 106a, 106b, 106c. The ACS 102 also demodulates signals received from other antenna systems. The ACS 102 further controls beam steering. The ACS 102 will be described in more detail below in relation to FIGS. 2-5.

Figure 2:
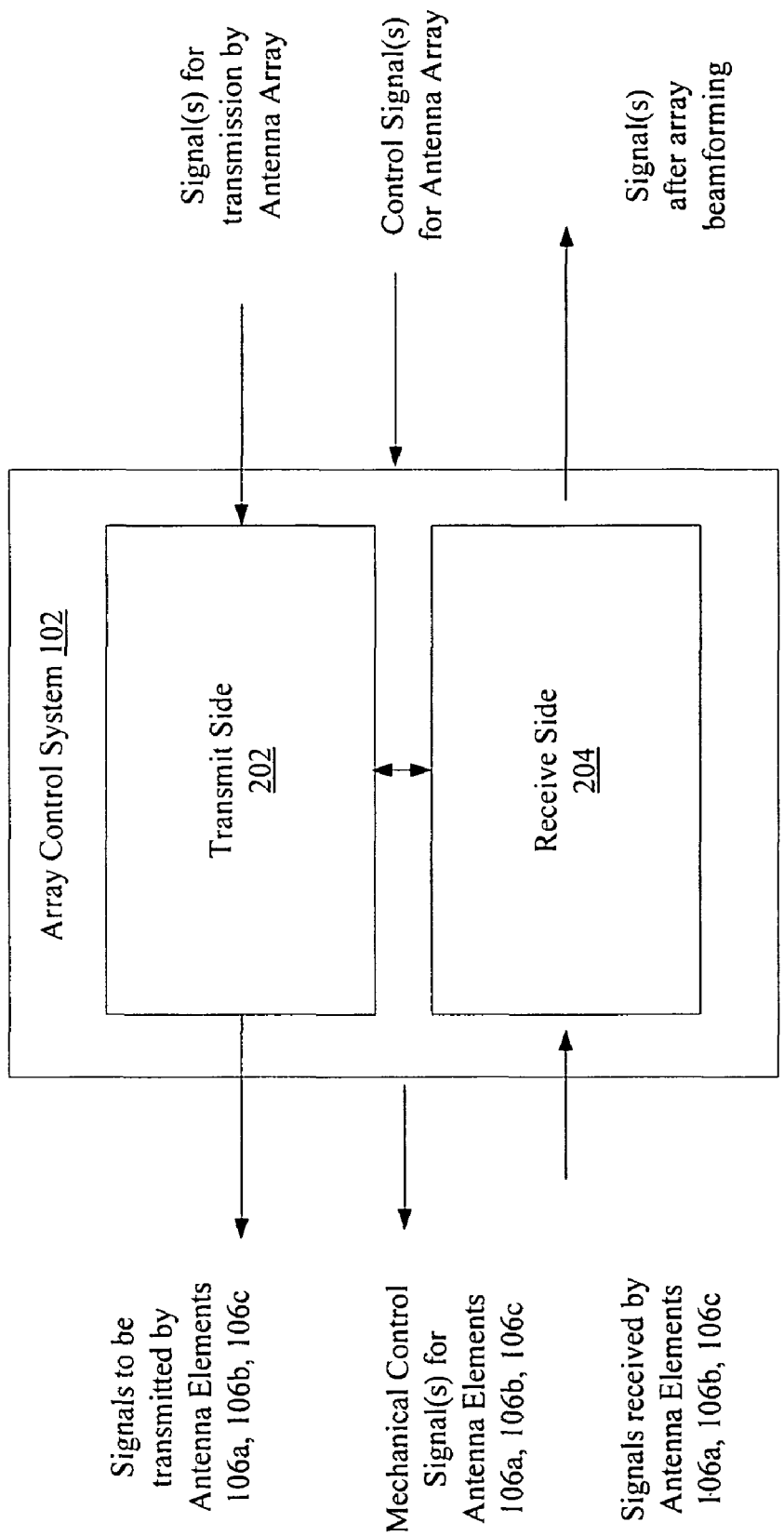
FIG. 2 is a block diagram of the element array control system shown in FIG. 1.

Referring now to FIG. 2, there is provided a more detailed block diagram of the ACS 102 in FIG. 1. As shown in FIG. 2, the ACS 102 includes a transmit side 202 and a receive side 204. Furthermore, the ACS 102 is be configured to manage both transmission and reception operations of the MEAS 150 based on signals for transmission and control signals. In particular, the transmit side 202 can generate signals to be transmitted by the RF equipment 104a, 104b, 104c via antenna elements 106a, 106b, 106c. Additionally or alternatively, the transmit side 202 can receive one or more signals from one or more signal generators (not shown) or receive external control signals. The transmit side 202 is also configured for modulating each of the generated or received signals and communicating the modulated signals to the RF equipment 104a, 104b, 104c for transmission. The transmit side 202 will be described in more detail below in relation to FIG. 3.

The receive side 204 is configured for receiving electrical signals generated by the RF equipment 104a, 104b, 104c based on the energy captured by the antenna elements 106a, 106b, 106c from passing waves. The receive side 204 is also configured for demodulating the electrical signal and communicating the demodulated electrical signal to an output device (not shown). The receive side 204 will be described below in more detail in relation to FIG. 4.

Although the transmit side 202 and the receive side 204 can operate separately or independently, as shown in FIG. 2, in some embodiments of the present invention, operation of the transmit side 302 can be further adjusted based on one or more signals generated in the receive side 204 of the ACS 102.

In the various embodiments of the present invention, the ACS 102 can control operation of the transmit side 202 and the receive side using a model-based control system or a calibration data-based control system. A "model-based" control system, as used herein, refers to a control system based on a computer simulation model of the communications system. In operation, a model-based control system receives configuration data that specifies pre-defined information about the arrangement and operation of the various components in the MEAS 150 and generates control signals for the MEAS 150 based on the response of the computer simulation model to user inputs for a communications task. A "calibration data-based" control system, as used herein, refers to a control system that generates control signals based on selecting and/or interpolating values from a lookup table of responses to previous user inputs. Therefore in the various embodiments of the present invention, the ACS 102 can receive configuration data specify calibration data or simulation data, including a computer simulation model and a set of associated model parameters.

Figure 3:
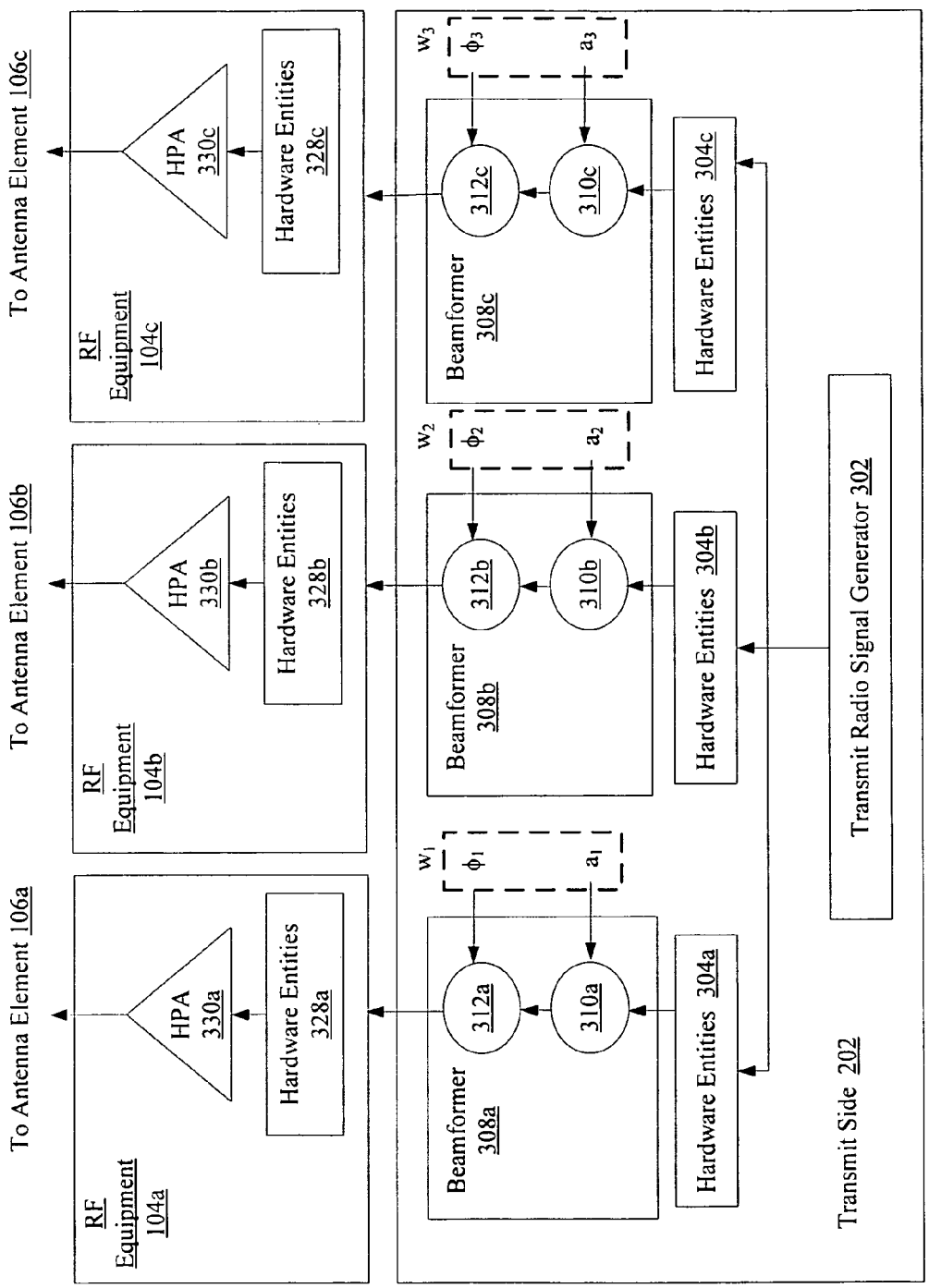
FIG. 3 is a block diagram of the transmit side of the system controller shown in FIG. 2 communicatively coupled to the RF equipment shown in FIG. 1.

Referring now to FIG. 3, there is provided a block diagram of the transmit side 202 of FIG. 2 communicatively coupled to the RF equipment 104a, 104b, 104c of FIG. 1. As shown in FIG. 3, the transmit side 202 is comprised of a Transmit Radio Signal Generator (TRSG) 302, hardware entities 304a, 304b, 304c, and beamformers 308a, 308b, 308c. The TRSG 302 generates signals to be transmitted from the array of antenna elements 106a, 106b, 106c. The TRSG 302 is communicatively coupled to the hardware entities 304a, 304b, 304c. The term "hardware entity", as used herein, refers to signal processing, including but not limited to filters and amplifiers. Each of the hardware entities 304a, 304b, 304c is communicatively coupled to a respective one of the beamformers 308a, 308b, 308c.

Each of the beamformers 308a, 308b, 308c can be utilized to control the phase and/or the amplitude of transmit signals for each antenna element 106a, 106b, 106c. In general, the respective phase shifts ($\phi_1$, $\phi_2$, $\phi_3$) and/or amplitude adjustments ($a_1$, $a_2$, $a_3$) for the antenna elements 106a, 106b, 106c can be used to adjust formation of the central beam 112, the side beams (or side lobes) 114 and nulls in the radiation pattern 111 of the MEAS 150. Nulls correspond to directions in which destructive inference results in a transmit signals strength that is significantly reduced with respect to the directions of the central beam 112 and the side beams 114. The combined amplitude adjustments $a_1$, $a_2$, $a_3$ and phase shift adjustments $\phi_1$, $\phi_2$, $\phi_3$ are referred to herein as a complex weight $w_1$, $w_2$, $w_3$. Each of the beamformers 308a, 308b, 308c combines a respective complex weight $w_1$, $w_2$, $w_3$ with the transmit signals to be provided to a respective RF equipment 104a, 104b, 104c. For example, as shown in FIG. 3, each beamformer 308a, 308b, 308c includes respective amplitude adjusters 310a, 310b, 310c for adjusting an amplitude of the transmit signals from hardware entities 304a, 304b, 304c, respectively, based on an amplitude $a_1$, $a_2$, $a_3$ Each beamformer 308a, 308b, 308c also includes phase adjusters 312a, 312b, 312c for applying adjusting a phase of the transmit signals from hardware entities 304a, 304b, 304c, respectively, based on a respective phase shift $\phi_1$, $\phi_2$, $\phi_3$ (or $\phi_1'$, $\phi_2'$, $\phi_3'$ as described below). The amplitude $a_1$, $a_2$, $a_3$ and phase shift $\phi_1$, $\phi_2$, $\phi_3$ can be generated based on a model or calibration data describing the behavior of the MEAS 151. Computation of the complex weights $w_1$, $w_2$, $w_3$ can be performed by any conventional methods based on calibration data or simulation data for the MEAS 150.

Each beamformer 308a, 308b, 308c is communicatively coupled to a respective hardware entity 328a, 328b, 328c of the RF equipment 104a, 104b, 104c to provided the weighted transmit signals. The hardware entities 328a, 328b, 328c are communicatively coupled to a respective high power amplifier (HPA) 330a, 330b, 330c. HPAs are well known to those having ordinary skill in the art, and therefore will not be described herein. However, it should be understood that the HPAs 330a, 330b, 330c communicate signals to the antenna elements 106a, 106b, 106c for transmission therefrom in the direction 116 of an object of interest 108.

Figure 4:
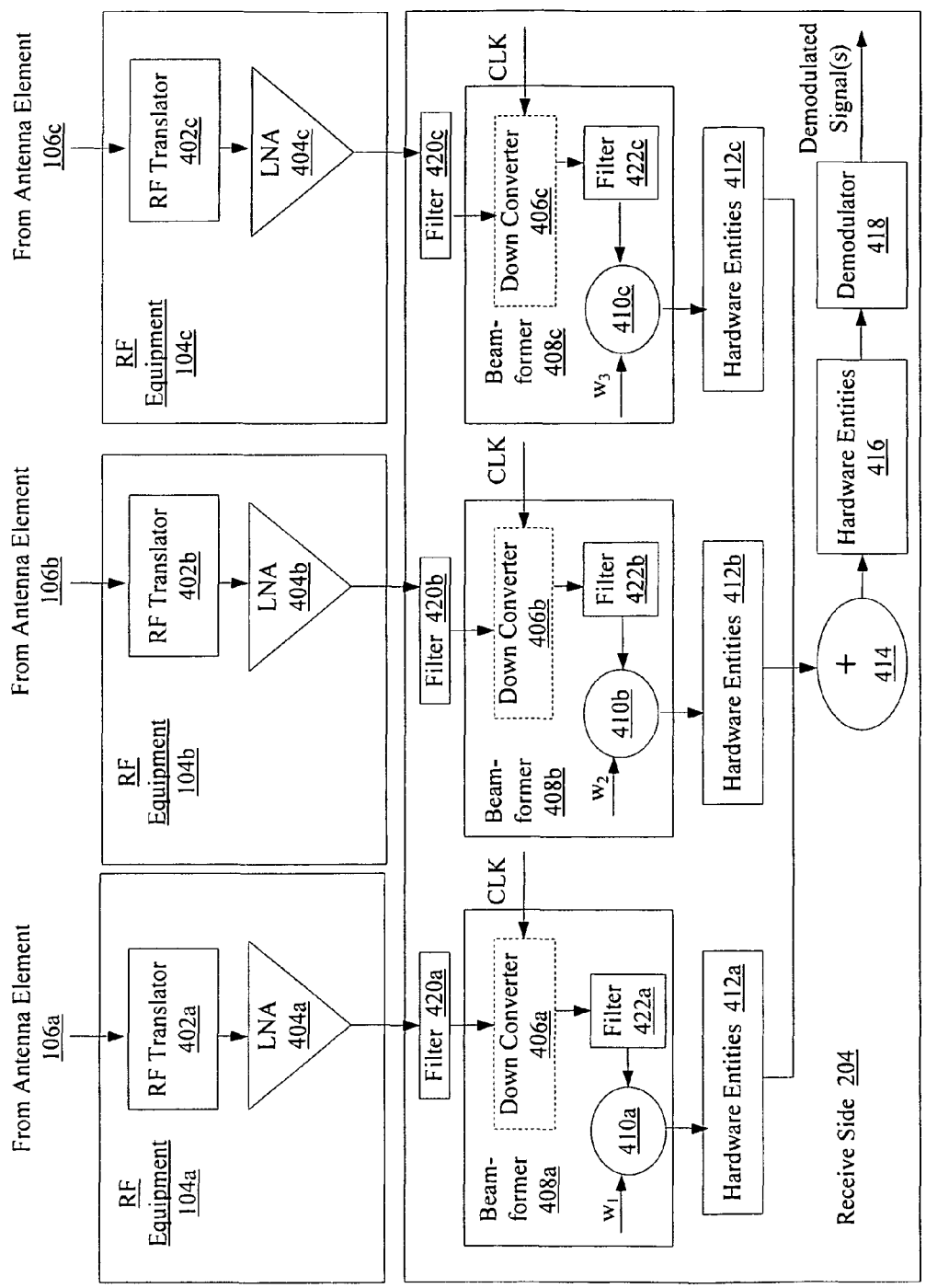
FIG. 4 is a block diagram of the receive side of the system controller shown in FIG. 2 communicatively coupled to the antenna controllers shown in FIG. 1.

Referring now to FIG. 4, there is provided a block diagram of the receive side 204 of FIG. 2 communicatively coupled to the RF equipment 104a, 104b, 104c of FIG. 1. As shown in FIG. 4, each of the RF equipment 104a, 104b, 104c further comprises a Radio Frequency (RF) translator 402a, 402b, 402c and a Low Noise Amplifier (LNA) 404a, 404b, 404c. Each of the RF translators 402a, 402b, 402c performs signal frequency translation of receive signals from a respective antenna element 106a, 106b, 106c in the respective antenna controller 104a, 104b, 104c. The translation function of the RF translators 402a, 402b, 402c generally converts the received signal at a respective antenna element 106a, 106b, 106c from an RF to an intermediate frequency (IF). The LNAs 404a, 404b, 404c generally amplify the IF signals output from the RF translators 402a, 402b, 402c, respectively. Each of the LNAs 404a, 404b, 404c is communicatively coupled to the receive side 204 of the ACS 102.

The receive side 204 further comprises a plurality of filters 420a, 420b, 420c, a plurality of beamformers 408a, 408b, 408c, hardware entities 412a, 412b, 412c, 416, a signal combiner 414, and a demodulator 418. Embodiments of the present invention are not limited in this regard. For example, the receive side 204 can be absent of the filters 420a, 420b, 420c and hardware entities 412a, 412b, 412c, 416.

As shown in FIG. 4, the filters 420a, 420b, 420c are communicatively coupled between the LNAs 404a, 404b, 404c and beamformers 408a, 408b, 408c. Each of the beamformers 408a, 408b, 408c can include a down converter 406a, 406b,

406*c*, a filter 422*a*, 422*b*, 422*c*, and a combiner 410*a*, 410*b*, 410*c*. Embodiments of the present invention are not limited in this regard. For example, the beamformers 408*a*, 408*b*, 408*c* can be absent of the down converters 406*a*, 406*b*, 406*c* and filters 422*a*, 422*b*, 422*c*.

Each down converter 406*a*, 406*b*, 406*c* can convert a digitized real signal centered at an IF to a basebanded complex signal centered at zero (0) frequency. The down converters 406*a*, 406*b*, 406*c* can share a common clock (not shown), and therefore receive the same clock (CLK) signal. The CLK signal can be generated within the receive side 204, elsewhere in the ACS 102, or external to the ACS 102. The down converters 406*a*, 406*b*, 406*c* can be set to the same center frequency and bandwidth. The down converters 406*a*, 406*b*, 406*c* can also comprise local oscillators that are in-phase with each other. This in-phase feature of the down converters 406*a*, 406*b*, 406*c* ensures that the down converters 406*a*, 406*b*, 406*c* shift the phases of signals by the same amount. After converting the digitized real signals to basebanded complex signals, the down converters 406*a*, 406*b*, 406*c* communicate the basebanded complex signals to the filters 422*a*, 422*b*, 422*c*, respectively. The filters 422*a*, 422*b*, 422*c* filter the basebanded complex signals and forward the same to the combiners 410*a*, 410*b*, 410*c*.

Each of the combiners 410*a*, 410*b*, 410*c* combines a basebanded complex signal with a complex weight $w_1$, $w_2$, $w_3$ for a particular antenna element 106*a*, 106*b*, 106*c*. The complex weights $w_1$, $w_2$, $w_3$ are selected to combine the receive signals according to a particular radiation pattern. That is, complex weights $w_1$, $w_2$, $w_3$ are selected to provide a central beam 112, side beams 114, and nulls, as described above, so as to preferentially receive signals from one or more preferred directions. The combiners 410*a*, 410*b*, 410*c* can include, but are not limited to, complex multipliers. Thereafter, the combiners 410*a*, 410*b*, 410*c* communicate the signals to the hardware entities 412*a*, 412*b*, 412*c*, respectively. The hardware entities 412*a*, 412*b*, 412*c* can further process the signals received from the beamformers 408*a*, 408*b*, 408*c*. The hardware entities 412*a*, 412*b*, 412*c* communicate the processed signals to the signal combiner 414.

At the signal combiner 414, the processed signals are combined to form a combined signal. The signal combiner can include, but is not limited to, a signal adder. Subsequent to forming the combined signal, the signal combiner 414 communicates the same to the hardware entities 416 for further processing. The hardware entities 416 can include, but are not limited to, filters and amplifiers. After processing the combined signal, the hardware entities 416 communicate the same to the demodulator for demodulation.

Figure 5:
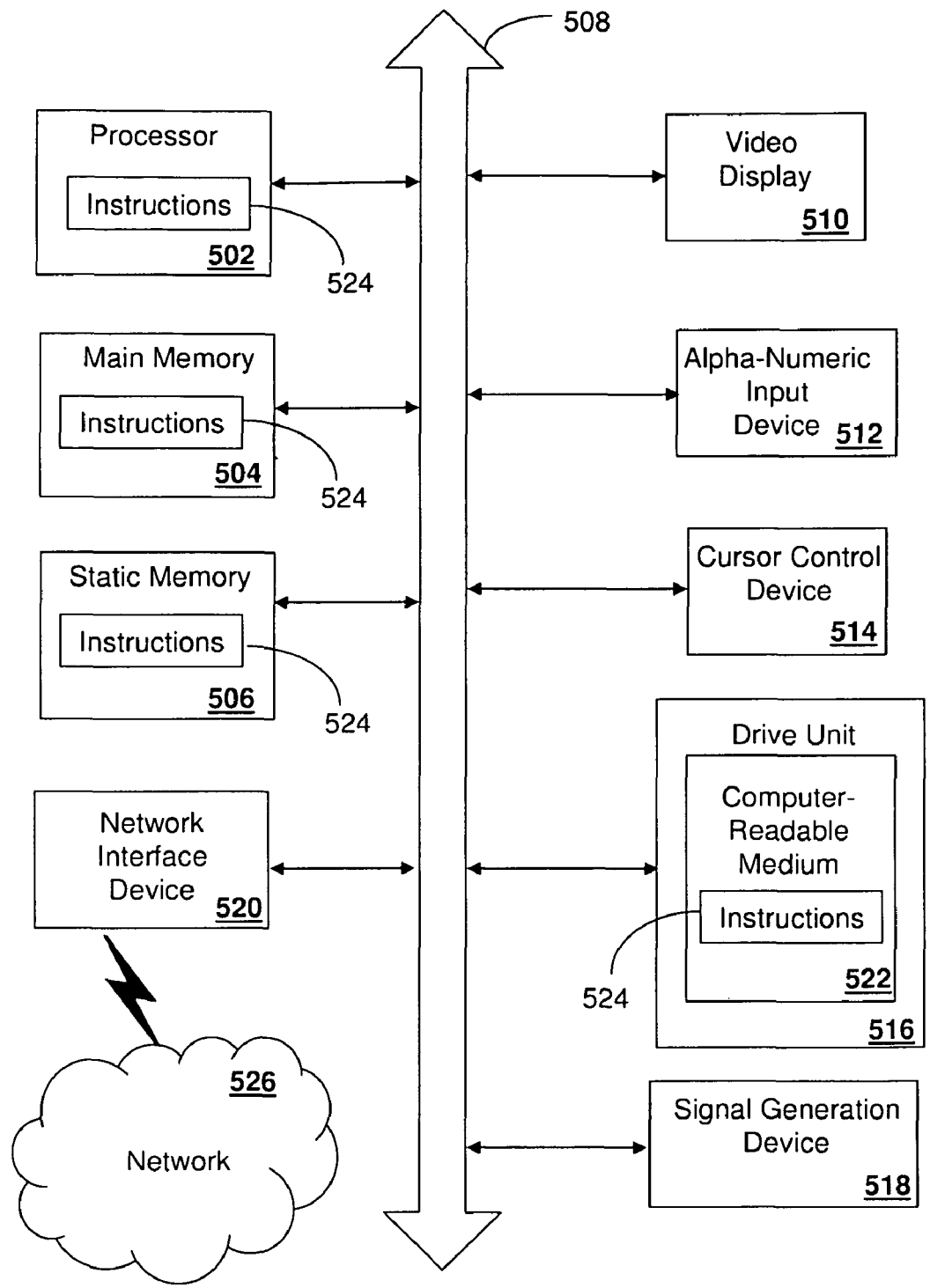
FIG. 5 is a schematic view of a computer system within which a set of instructions operate according to an embodiment of the present invention.

FIG. 5 is a schematic diagram of a computer system 500 for executing a set of instructions that, when executed, can cause the computer system to perform one or more of the methodologies and procedures described above and below. For example, a computer system 500 can be implemented to perform the various tasks of the ACS 102, including calculation of complex weights $w_1$, $w_2$, $w_3$, as described above, or calculation of differential distances and phase adjustments, as described below. In some embodiments, the computer system 500 operates as a single standalone device. In other embodiments, the computer system 500 can be connected (e.g., using a network) to other computing devices to perform various tasks in a distributed fashion. In a networked deployment, the computer system 500 can operate in the capacity of a server or a client developer machine in server-client developer network environment, or as a peer machine in a peer-to-peer (or distributed) network environment.

The computer system 500 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 500 can include a processor 502 (such as a central processing unit (CPU), a graphics processing unit (GPU, or both), a main memory 504 and a static memory 506, which communicate with each other via a bus 508. The computer system 500 can further include a display unit 510, such as a video display (e.g., a liquid crystal display or LCD), a flat panel, a solid state display, or a cathode ray tube (CRT)). The computer system 500 can include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 can include a computer-readable storage medium 522 on which is stored one or more sets of instructions 524 (e.g., software code) configured to implement one or more of the methodologies, procedures, or functions described herein. The instructions 524 can also reside, completely or at least partially, within the main memory 504, the static memory 506, and/or within the processor 502 during execution thereof by the computer system 500. The main memory 504 and the processor 502 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 524 or that receives and executes instructions 524 from a propagated signal so that a device connected to a network environment 526 can send or receive voice and/or video data, and that can communicate over the network 526 using the instructions 524. The instructions 524 can further be transmitted or received over a network 526 via the network interface device 520.

While the computer-readable storage medium 522 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Transmission Phasing Error Correction

As previously described, one aspect of the present invention is determining the differential distance for an antenna element relative to a reference antenna element in the antenna array during transmission of a signal. That is, during transmission of a signal, the antenna element can capture signals, at the same or different frequency as the transmission frequency, from radiometric sources that are currently within the central beam. Therefore, the differential distances and thus the phase adjustments or corrections can be computed without having to stop a current transmission task.

The term "differential distance", as used herein, refers to the additional distance a wavefront needs to travel to reach a phase center of the second antenna element after the wavefront has reached a phase center of the first antenna element. The term "phase center", as used herein with respect to an antenna element, refers to a point from which the electromagnetic radiation generated by the antenna element spreads spherically outward, with the phase of the signal being generally equal at any point on the sphere.

Figure 6A:
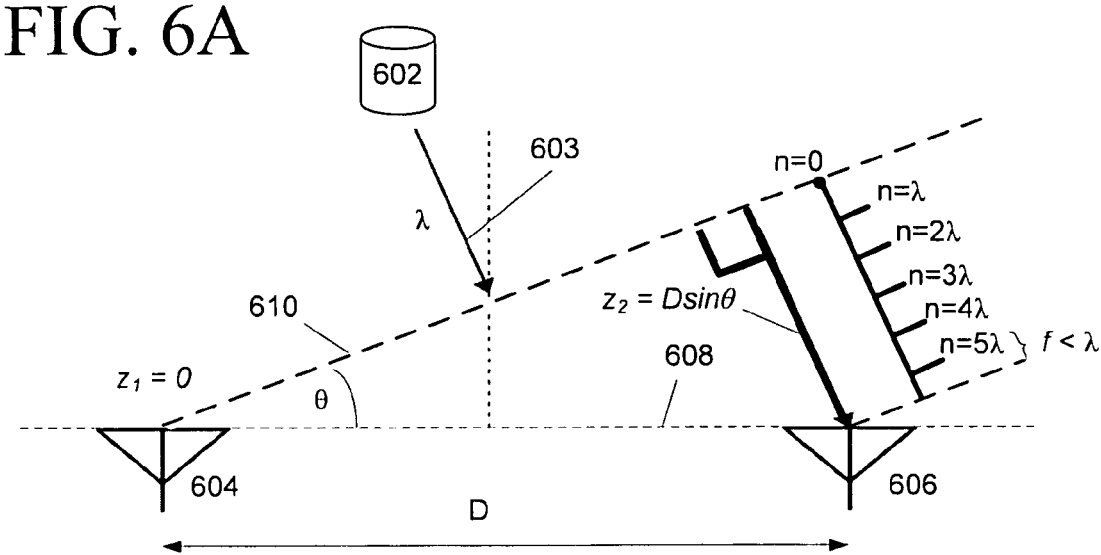
FIGS. 6A and 6B are schematic views of possible causes of differential distances between antenna elements in an array.

In general, a differential distance between antenna elements is typically associated with a particular angle of arrival (AOA) of the signal at the antenna elements. That is, the angle of the wavefront of the received signal with respect to a plane containing the first and second antenna elements. This is conceptually illustrated in two dimensions in to FIG. 6A. In general, unless an object 602 transmits a signal 603 at a wavelength λ towards first 604 and second 606 antenna elements separated by a distance D in a direction normal to the plane 608 defined by the phase centers of the first 604 and second 606 antenna elements, the wavefront 610 of the signal 603 will arrive at the plane 608 at some AOA (θ) that is greater or less than zero. As a result, as shown in FIG. 6A, the wavefront 610 will reach the first antenna element 604 at a first time and at a later time the wavefront 610 will reach the second antenna element 606. As a result, the portion of the wavefront 610 reaching the second antenna element 606 travels an additional distance D sin θ, a differential distance $z_2$.

Figure 6B:
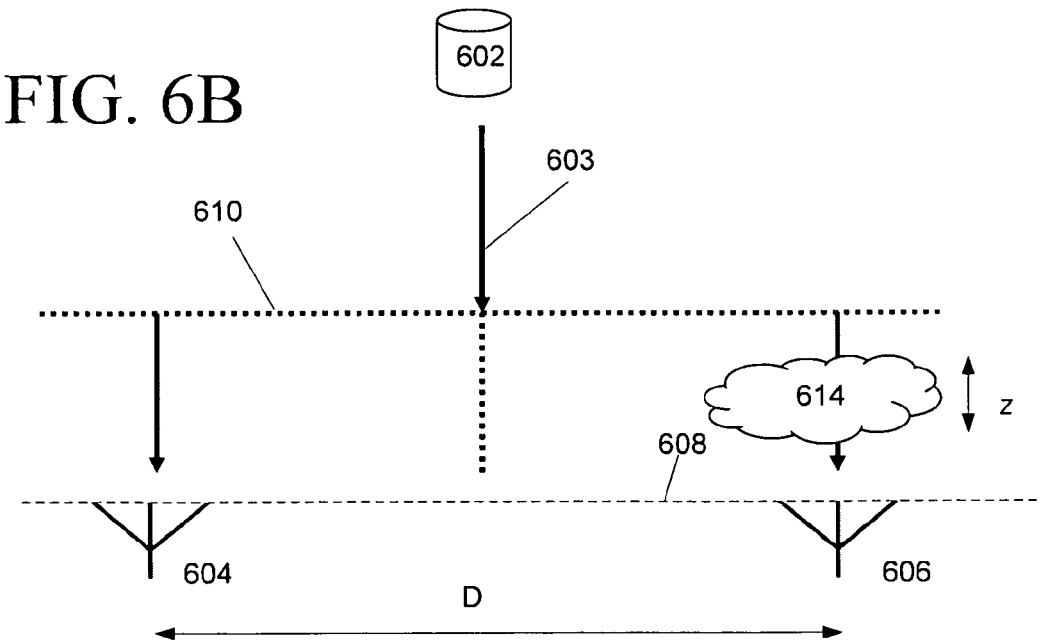

Although the differential distance Z could be estimated based on θ and D, the actual differential distance is affected by other factors, resulting in a difference between the estimated and actual differential distances. For example, value of D may not be accurate know. In another example, variation in the actual differential distance can also arise if objects are present in the path of the portion of the signal reaching at least one of the antenna elements. For example, as shown in FIG. 6B, the portion of the signal reaching the second antenna element 606 may pass through a cloud 614 or other atmospheric disturbance or phenomena. As a result, even if the signal 603 is transmitted normal to the plane 608 defined by the phase centers of the first 602 and second 604 antenna elements, as shown in FIG. 6B, the wavefront will propagate differently through cloud 614. This difference in propagation effectively operates as a differential distance Z.

For illustrative purposes, the various embodiments of the present invention will be described with respect to first and second antenna elements, where one of the antenna elements is a reference element. However, the various embodiments of the present invention are not limited to determining the differential distances with respect to a reference antenna element. Rather, in some embodiments of the present invention, a reference location can be utilized instead and each antenna element in the array will be associated with a differential distance with respect to the reference location. For example, with respect to FIGS. 6A and 6B, the first antenna element 602 can comprise a location with or without an antenna element. Although any reference location can be selected, in some embodiments of the present invention, the reference location is selected to be within the antenna array.

As previously described, the phase of a signal will vary as it travels through a communications medium (e.g., air or space). If a signal travels a differential distance Z, as described above, the signal 603 will undergo additional phase variation or phase propagation prior to reaching the second antenna element 606 as compared to the first antenna element 604. This difference can generally be expressed as n+f wavelengths, where n is the number of whole or complete wavelengths and f is the number of fractional wavelengths (f<λ) the phase of the signal varies over the differential distance. For example, as shown in FIG. 6A, the signal 603 undergoes a phase propagation of 5λ+f over the differential distance z2. This quantity can also be expressed as $z_2/\lambda_{RX}$, where $z_2$ is the differential distance for the second antenna element and $\lambda_{RX}$ is the wavelength of the signal being received.

The difference in phase (n+f) can generally be modeled using the steering vector ($\vec{v}$). A "steering vector", as known to one or ordinary skill in the art, is an array describing the properties of the signal at each antenna element. A steering vector for two elements, as shown in FIG. 6A, can generally be expressed as shown below in Equation (1):

$$\vec{v} = \begin{bmatrix} amplitude_1 e^{j(\omega t - \beta z_1)} \\ amplitude_2 e^{j(\omega t - \beta z_2)} \end{bmatrix} \quad (1)$$

where ω is a radian frequency of the signal, β is a wave number of the signal expressed as $2\pi/\lambda_{RX}$, and $z_i$ is differential distance for each element.

For large arrays of reflector elements (i.e., greater than 200's of meters), the steering vector can be rewritten as a product of signal amplitude, frequency, and phase, as shown in below in Equation (10):

$$\vec{v} = \begin{bmatrix} amplitude_1 \\ \vdots \\ amplitude_k \end{bmatrix} \otimes \begin{bmatrix} e^{j\omega t} \\ \vdots \\ e^{j\omega t} \end{bmatrix} \otimes \begin{bmatrix} e^{-j\beta z_1} \\ \vdots \\ e^{-j\beta z_k} \end{bmatrix} \quad (2)$$

where $$\begin{bmatrix} e^{-j\beta z_1} \\ \vdots \\ e^{-j\beta z_k} \end{bmatrix}$$

is the array factor, $$\beta = \frac{2\pi}{\lambda},\ z = D\hat{u},\ \text{and}\ \hat{u} = \begin{bmatrix} \sin\theta_i\cos\phi_i \\ \sin\theta_i\sin\phi_i \\ \cos\theta_i \end{bmatrix}$$

for a signal, i, which allows the steering vector phase term to specify an array factor vector (AF), to be used model the phase difference between the antenna elements. In the 2-element case depicted in FIG. 6A:

$$AF \triangleq \begin{bmatrix} e^{-j\beta z_1} \\ e^{-j\beta z_2} \end{bmatrix} = \begin{bmatrix} 1 \\ e^{-j\frac{2\pi}{\lambda}D\sin\theta} \end{bmatrix} \quad (3)$$

Since $z_1 = D\sin\theta = 0$ for the first element 604 (i.e., the reference element in the array) and $e^0 = 1$.

This term is a function of array frequency $1/\lambda_{RX} = f_{RX}/c$ (where c is the speed of light) and the distance or separation between the elements, D. Therefore, assuming that the first element is used as a phase reference, then the fractional phase difference (f) at the second antenna element is described by Equation (4):

$$\text{mod}2\pi\left(\frac{z}{\lambda_{Rx}}\right) = \text{mod}2\pi\left(\frac{D\sin\theta}{\lambda_{Rx}}\right) = f \quad (4)$$

where f is the modeled fractional part of a wavelength at the receive frequency, $f_{Rx}$ for the second antenna element. After calculating the fraction portion, f using the BSS process described below, the whole number of wavelengths, n can be calculated as shown below:

$$\frac{D\hat{u}}{\lambda_{Rx}} = \frac{z}{\lambda_{Rx}} = n + f \quad (5)$$

where $$\hat{u} = \begin{bmatrix} \sin\theta_i\cos\phi_i \\ \sin\theta_i\sin\phi_i \\ \cos\theta_i \end{bmatrix}$$

is a unit line of sight vector for a particular signal, i.

Using Equation (13), the modeled differential distance can be replaced by the true differential distance. The true differential distance can then be used for correcting beamforming during a transmission operation. For example, the true differential distance can be used with a model of the communications system to determine the correct weights to form a beam for transmit signals.

In an array of very widely spaced elements, an exact whole number of wavelengths typically cannot be measured. However, the actual fractional phase difference f can be calculated by generated a steering vector for the actual signal using an adaptive blind source separation (BSS) algorithm, as described below. Therefore, even though the actual value of n is generally unascertainable, the actual value of f can be combined with the estimated value of n to allow calculation of a differential distance value for the second antenna element with increased accuracy. This is conceptually described below with respect to FIGS. 7A-7C.

Figure 7A:
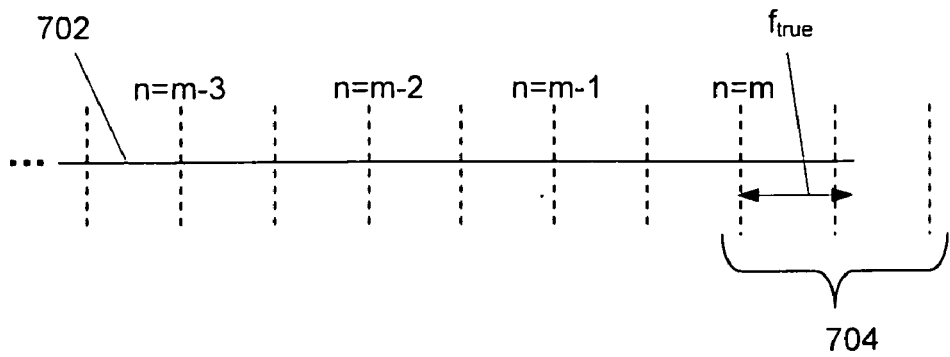
FIG. 7A is a exemplary diagram showing actual phase propagation along a differential distance between a first and a second antenna element in an array and a residual phase value computed according to an embodiment of the present invention.

FIG. 7A shows a schematic of phase propagation 702 of a signal along a differential distance between a first and a second antenna element. As previously described, as the signal 702 traverses the differential distance, the signal will undergo some amount of phase propagation $n_{true}+f_{true}$, where $n_{true}$ is equal to an unknown number of whole wavelengths m. Unfortunately, determining a value for m for a received signal is non-trivial. When array element spacing is on order of thousands wavelengths, it is difficult to determine phase to a few degrees, since this amounts to measuring to a few parts per million accuracy. For example, for X-band frequencies, a wavelength is approximate an inch and so accuracies of about 1/100 of an inch are generally needed over an antenna element separation distance of 200 to 300 feet. Although, many surveying techniques (including laser metrology) are accurate to less than one inch over this distance (about one full wavelength), measuring such a delay using such an external source would require a bandwidth of 2 GHz or more to obtain reliable results. This is 3 to 4 orders of magnitude wider than most deep space downlinks. (Although quasars have such bandwidth, they are generally very weak and would require long integration times during which time, array parameters could change.) Although using measurement data is generally prohibitive, since the phase of the as-received signal can generally always be measured, a value for $f_{true}$, commensurate with the final portion 704 of the phase propagation 702 of the as-received signal, can generally be determined using an adaptive BSS algorithm, as described below.

Figure 7B:
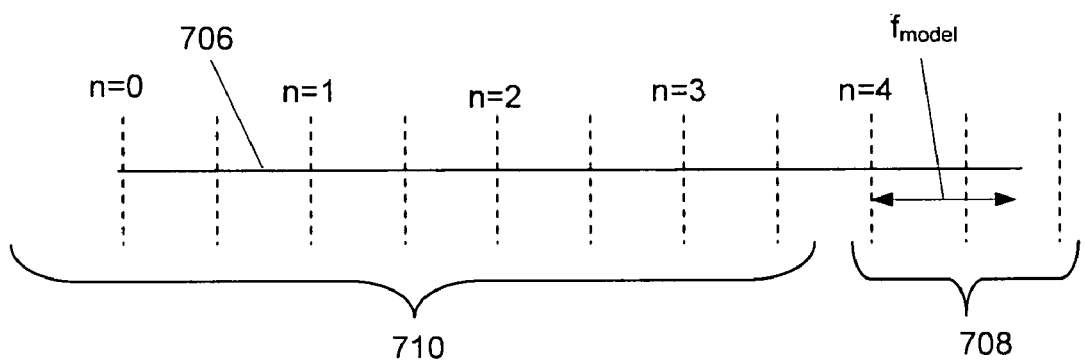
FIG. 7B is a exemplary diagram showing estimated phase propagation along a differential distance between a first and a second antenna element in an array computed according to an embodiment of the present invention.

Additionally, both $n_{true}$ and $f_{true}$ can be modeled to provide modeled values $n_{model}$ and $f_{model}$ for estimating a differential distance, as described above, for the signal in FIG. 7A. FIG. 7B shows a schematic of estimated phase propagation 706 of the signal in FIG. 7A. Although the estimated phase propagation 706 can be used to determine an estimated differential distance based on $n_{model}$ and $f_{model}$, the transmission medium variation and antenna element location errors result in a variation of the value of a $f_{model}$ as compared to $f_{true}$. However, even though the portion 708 of the estimated phase propagation 706 associated with $f_{model}$ may not be accurate, the portion 710 of the estimated phase propagation 740 can be assumed to represent the number of whole wavelengths for the actual phase propagation 702 in FIG. 7A with a high degree of accuracy. Generally, such an assumption can be made when the error in the location of the antenna elements is within a wavelength. Therefore, in the various embodiments of the present invention, to provide an accurate estimate of the phase propagation and therefore allow computation of an accurate differential distance, the differential distance can be estimated using a combination of $n_{model}$ and $f_{true}$.

Figure 7C:
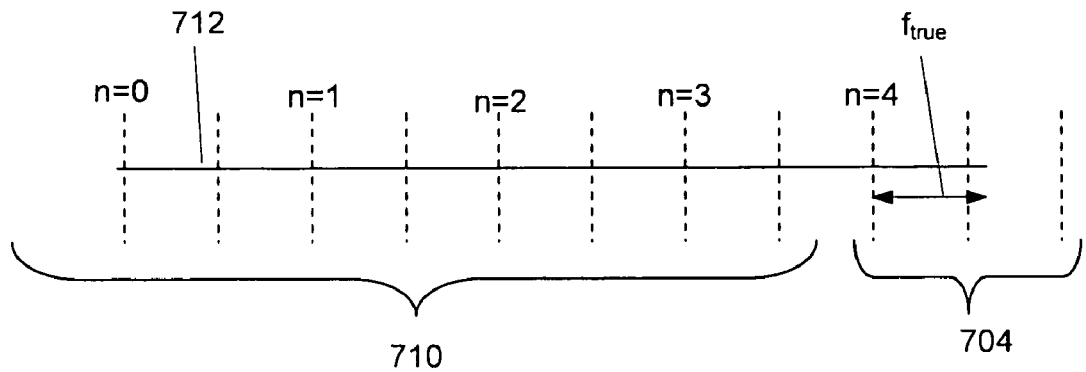
FIG. 7C is a exemplary diagram showing an adjusted or "true" phase propagation along a differential distance between a first and a second antenna element in an array computed according to an embodiment of the present invention.

For example, FIG. 7C shows a schematic of a "true" phase propagation 712 of the signal in FIG. 7A. To construct phase propagation 712, the estimated phase propagation 706 is selected and the portion 708 is replaced with portion 704 from phase propagation 702. As a result, since $n_{model}$ is assumed to be correct and the $f_{true}$ (based on portion 704) is known, a more accurate estimate of the differential distance can be performed.

In the exemplary replacement process shown in FIGS. 7A-7C above, it is assumed that the $n_{model}$ and $n_{true}$ have the same number of wavelengths. However, the $n_{model}$ value can also be higher or lower than the $n_{true}$ value. Accordingly, to obtain a correct phase propagation (i.e., correct values for computing the sum of $n_{model}$ and $f_{true}$), some additional considerations can be required. If it is assumed that the phase propagation values for the modeled ($n_{model}$, $f_{model}$) and "true" ($n_{true}$, $f_{true}$) phase propagation differ by less than one wavelength, then the difference between the modeled and actual differential distances for an antenna element can be expressed as:

$$|z_{model} - z_{true}| < \frac{1}{2}\lambda \quad (6)$$

Therefore, the difference in phase ($\phi = z/\lambda$) can be expressed as:

$$|\phi_{model} - \phi_{true}| < \frac{1}{2} \Rightarrow \left|\frac{z}{\lambda}\text{model} - \frac{z}{\lambda}\text{true}\right| < \frac{1}{2} \quad (7)$$

or $$|(n_{model} + f_{model}) - (n_{true} + f_{true})| = \quad (8)$$
$$|(n_{model} - n_{true}) - (f_{true} - f_{model})| < \frac{1}{2}$$

Setting $n_{model} - n_{true} = k$ and $f_{true} - f_{model} = p$, Equation (15) reduces to:

$$|k - p| < \frac{1}{2} \quad (9)$$

where $k \in \{-1, 0, 1\}$.

Using $p = (f_{true} - f_{model})$ and $k = (n_{model} - n_{true})$ $n_{true}$ is obtained since $n_{true} = (n_{model} - k)$ and used to correct the modeled differential distance.

The method of replacement in FIGS. 7A-7C will therefore vary according to the value of k. In the case of k=0, $n_{model}$ and $n_{true}$ are the same, therefore replacement can be performed as described above in FIGS. 7A-7C. In the case of k=1, this means that $n_{model}$ is greater than $n_{true}$. In such a case, the outright replacement of portion 708 with portion 704, as described in FIGS. 7A-7C would result in the n value for phase propagation 710 to be one integer wavelength too high and result in an overestimate of the differential distance. As a result, the combination step would require reducing n by one integer wavelength prior to computing the differential distance. In the case of k=-1, this means that $n_{model}$ is less than $n_{true}$. In such a case, the outright replacement of portion 708 with portion 704, as described in FIGS. 7A-7C would result in the n value for phase propagation 710 to be one integer wavelength too low and result in an underestimate of the differential distance. As a result, the combination step would require increasing n by one integer wavelength prior to computing the differential distance.

Although the determination of adding or removing wavelengths can be performed manually, the process can also be generalized as shown below. Since both $f_{true}$ and $f_{model}$ are known, k can be calculated and $n_{true}$ can be expressed as:

$$n_{true} = n_{model} - k = n_{model\_adjusted} \quad (10)$$

and $n_{model\_adjusted}$ can be calculated as:

$$n_{model\_adjusted} = \text{floor}\frac{\frac{2\pi}{\lambda} \cdot z_{model}}{2\pi} = \text{floor}\left(\frac{f}{c} \cdot z_{model}\right) \quad (11)$$

Using Equations (10) and (11), $n_{model}$ and $n_{true}$ can be calculated and the floor function provides the necessary adjustment to add or remove the additional wavelength. Substituting into $z_2/\lambda_{RX} = n + f$, the "true" value for $z_2$ (i.e., the differential distance for the second antenna element) can be then expressed as:

$$z_{2,true} = \lambda_{RX}(n_{true} + f_{true}) \quad (12)$$

which can be used in equation (7) to provide phase information for the antenna element of interest.

Once the differential distance is calculated, it can be used to provide a phase correction for the signal being transmitted. Referring back to Equation (3), it was noted that for the system in FIG. 6, the phase component describing the difference between antenna elements 604 and 606 was described by $$e^{-j\frac{2\pi}{\lambda}D\sin\theta},$$

where $Z = D\sin\theta$. Therefore the phase correction ($\Delta\phi$) for the transmitted signal at a particular AOA can be expressed as:

$$\Delta\phi = e^{-j\frac{2\pi}{\lambda_{Tx}}z_{true}} \quad (13)$$

where $\lambda_{Tx}$ is the wavelength of the transmitted signal. In some embodiments, such a correction can be applied at the beamformer for the antenna element. As additional signals are received at other AOAs, additional phase correction values can be calculated for these AOAs and can also be used to adjust the model-based control system.

Although FIGS. 6A-6B and FIGS. 7A-7C present an example for calculating a phase correction for an antenna element with respect to a reference antenna element, the present invention is not limited in this regard. In the various embodiments of the present invention, the differential distances can be used to update configuration data for a control system controlling the operation of an array of antenna elements to allow phase corrections can be computed for all of the antenna elements. For example, referring back to FIGS. 1-3 the ACS 202 can compute a steering vector for the received signal at all of antenna elements 106a, 106b, 106c, corresponding $f_{true}$ values based on the steering vector, and corresponding differential distance values, as described above Afterwards, during a transmission beamforming operation, the weights $w_1$, $w_2$, $w_3$ will then include phase corrections $\Delta\phi_1$, $\Delta\phi_2$, $\Delta\phi_3$. For example, the transmission weights $w_1$, $w_2$, $w_3$ can provide phase adjustment weights of $\phi_1'$, $\phi_2'$, $\phi_3' = \phi_1 + \Delta\phi_1$, $\phi_2 + \Delta\phi_2$, $\phi_3\Delta\phi_3$ for antenna elements 106a, 106b, 106c instead of the standard phase adjustment weights $\phi_1$, $\phi_2$, $\phi_3$. Additionally, as previously described, values for subsequent phase corrections $\Delta\phi_1$, $\Delta\phi_2$, $\Delta\phi_3$ at different AOAs can be computed and used to further adjust the model-based control system of the ACS 102.

BSS Algorithm for Computing $f_{true}$

As previously described, measurement of $f_{true}$ can be performed using an adaptive BSS algorithm, including open loop and closed loop methods. For example, in a closed loop method, the standard system covariance matrix, $R_x$ for computing the steering vector, is formed from the expected value of the outer product of the input signal vector. If $\vec{x}(t)$ is the vector of inputs from the array elements, then $$\vec{x}(t) = \begin{bmatrix} \sigma_1(t) \\ \sigma_2(t) \\ \vdots \\ \sigma_n(t) \end{bmatrix} + \sum_{i=1,k} m_i(t)\sqrt{P_i}\,\vec{v}_i \quad (14)$$

where $\sigma(t)$ is the thermal noise for a given input, $m_i(t)$ is the complex modulation for a particular source, P is the source's power and $\vec{v}_i(t)$ is its steering vector. The covariance matrix is calculated by forming the vector outer product and taking an expected value, denoted by E( ) and provides:

$$R_x = E(\vec{x}^*(t)\vec{x}^T(t)) = \sigma^2 + \Sigma P_i \vec{v}_i^* \vec{v}_i^T \quad (15)$$

The thermal noise matrix is generally of the following form, $$\sigma^2 = \begin{bmatrix} \sigma_1^2 & & & \\ & \sigma_2^2 & & \\ & & \ddots & \\ & & & \sigma_n^2 \end{bmatrix} \quad (16)$$

while the complex modulation function $m_i(t)$ is defined so that $E[m_i^*(t)m_i(t)]=1$ for a given source and that $E[m_i^*(t)m_j(t)]=0$ for source-to-source cross correlations.

Inspection of $R_x$ shows that the expected value operation removes all source-to-source vector inner and outer cross products. Consequently, one is unable to 'go back' and determine the various signal steering vectors exactly without additional information.

Alternatively, a pair of similar matrices with different information content can be solved simultaneously for the steering vectors. The necessary matrices are obtained without the need for calibration, thus general array control can be accomplished without calibration. Subsequent AOA determination can then proceed on a source-by-source basis, with AOA precision dependent upon calibration, but with graceful degradation versus errors and without catastrophic algorithm failure. Furthermore, the nonuniform thermal matrix can be removed so that the solutions are unbiased, even for very weak LPI signals.

The standard covariance matrix $R_x$ is selected as the primary matrix. At least three methods are known for obtaining a second similar matrix. Probably the simplest conceptually is the delayed covariance, which we refer to as $R_\tau$. One has $$R_\tau = E[x^*(t-\tau)x^T(t)] = h(\tau)\sigma^2 + \sum_{i=1,k} q_i(\tau)P_i v_i^* v_i^T \quad (17)$$

In the above, the scalar $h(\tau) \leq 1$. The complex constant, $|q_i(\tau)| \leq 1$ and is dependent upon the source's carrier frequency and time delay. For a narrow band source, $q_i(\tau)$ is simply a phase shift, but sources with modulation also suffer a correlation amplitude loss with increasing delay. Different modulation types produce different q functions. For example, PSK modulation has a q value that linearly decreases with delay, becoming zero at an inverse bandwidth while the q for bandlimited white noise follows a sin(x)/x variation. The most important discriminant is the phase of q, which in a practical signal environment is virtually always different from source to source. In a Doppler shifted environment, even phase locked sources at different locations will display frequency offsets and thus different q values. Note that $R_\tau(0)=R_x$ (zero correlation delay). Delay values approaching an inverse bandwidth are effective in many applications.

To address the matrices having the diagonal noise terms, consider solving the eigenvalue equation $$R_\tau e = \lambda R_x e. \quad (18)$$

After regrouping terms and simplifying, $$\sum_{i=1,k} \vec{v}_i^* [\lambda - q_i(\tau)] P_i(v_i^T e) + (\lambda - h)\sigma^2 e = 0. \quad (19)$$

Again, two solution types are obtained. The solution of interest is from the noise sub-space, and is characterized by eigenvectors orthogonal to all of the steering vectors simultaneously. For an N input array and k signals, there are (N−k) such eigenvectors, and they will all have repeat eigenvalues, $\lambda=h$. Multiplying $R_x$ by one of the noise sub-space eigenvectors yields $$\vec{u} = R_x e = \sigma^2 e. \quad (20)$$

All signal subspace matrices are eliminated from the product because e is orthogonal to all steering vectors. Expanding u provides:

$$\vec{u} = \begin{bmatrix} u_1 \\ u_2 \\ \vdots \\ u_{n1} \end{bmatrix} = \begin{bmatrix} \sigma_1^2 e_1 \\ \sigma_2^2 e_2 \\ \vdots \\ \sigma_n^2 e_n \end{bmatrix}. \quad (21)$$

Since u and e are known, one can solve for the $\sigma_i^2$ on a term-by-term basis, thus $\sigma_i^2$ is determined. One may now remove $\sigma_i^2$ and $\sigma_{\tau i}^2$ from $R_x$ and $R_\tau$ respectively, obtaining a set of singular matrices designated T. Note that one degree of freedom is required to solve for $\sigma^2$.

Once the noise terms have been determined, a fundamental process for solving for unbiased steering vector using singular matrices can be used. Let $$T_x = R_x - \sigma^2 = \sum_{i=1,k} P_i \vec{v}_i^* \vec{v}_i^T, \quad (22)$$

and $$T_\tau = R_\tau - h(\tau)\sigma^2 = \sum_{i=1,k} q_i(\tau) P_i \vec{v}_i^* \vec{v}_i^T. \quad (23)$$

If the generalized eigenvectors and eigenvalues are found of the above set of equations. One has:

$$T_{\tau e} = \lambda T_x e. \quad (24)$$

Expanding Equation (22) therefore provides:

$$\lambda \sum_{i=1,k} P_i \vec{v}_i^* (\vec{v}_i^T e) = \sum_{i=1,k} q_i(\tau) P_i \vec{v}_i^* (\vec{v}_i^T e). \quad (25)$$

which after collecting terms and regrouping yields, $$\sum_{i=1,k} \vec{v}_i^* [\lambda - q_i(\tau)] P_i (\vec{v}_i^T e) = 0. \quad (26)$$

Since the individual steering vectors are independent, each of the terms in the summation must be zero independently. There are two types of solutions. For the trivial solution, $(\vec{v}_i^T e) = 0$ for all steering vectors and the eigenvalue is indeterminate. This is the null sub-space of this system of equations. For an N input array and k signals, this space has dimension (N−k). The second type of solution has $(\vec{v}_i^T e) = 0$ for all steering vectors but one, $v_j$. This remaining term is then satisfied by an associated eigenvalue such that $$\lambda_i = q_i(\tau) \quad (27)$$

This is the signal sub-space of the system of equations, and it has dimension k. The $j^{th}$ steering vector is then obtained by forming the product $$T_x e_j = P_j \vec{v}_j (\vec{v}_j^T e_j) = (\text{scalar}) \vec{v}_j. \quad (28)$$

Normalization removes the scalar, then one can solve for $P_j$ since all other terms in the expression are known.

The preliminary step of solving for the noise covariance matrix in (21) and removing it in (22) are very important steps in obtaining the exact result of (28). In a practical system, the diagonal noise matrix always has different values for each input and thus cannot equal the identity matrix times a scalar. Eigenvector decomposition of a practical noise covariance matrix in combination with signal covariances can not be decomposed into exact signal and noise sub-spaces unless the diagonal noise matrix equals the identity times a scalar. Thus, without correction, competing algorithms such as MUSIC (MUltiple SIgnal Characterization) produce biased steering vector estimates. Practically, this limitation prevents those algorithms from finding and characterizing weak signals.

Although one procedure for obtaining a steering vector has been described above in detail, embodiments of the present invention are not limited in this regard. In other embodiments of the present invention, other methods for obtaining a second covariance matrix are also suitable, including polarization and fourth order co-variance methods, such as cumulant-based methods.

FIG. 8 is a flowchart of steps in an exemplary method 800 for operating an array of antenna elements in accordance with an embodiment of the present invention. Method 800 begins at step 802 and continues on to step 804. In step 804 a model of the array or calibration data for the array can be received. The model and/or the calibration data provide a description or configuration of the array that includes or allows estimation of phase center locations for the various elements in the array. The estimation of the phase center location can be based purely on the known physical aspects of the antenna element or based on previously acquired calibration data. However, the present invention is not limited in this regard and the phase center locations can also be based on estimates of phase errors in various portions of the array.

Concurrently or subsequent to step 804, signal data for at least one signal can be received at first and second antenna elements at step 806 during a transmission operation. As previously described, this signal can be received from a radiometric source currently within a central beam of array of antenna elements. That is, while communicating with an object of interest within the central beam, signals from radiometric sources that are also within the beam can be used for calculating differential distances. Although such reference objects will not be at the exact center of the central beam, the differences in AOA for such reference objects will generally not be significant enough to cause a miscalculation of the differential distance.

In the various embodiments of the present invention, the term "radiometric source" refers to any object providing radio emissions detectable by the array of antenna elements. For example, these can include artificial objects, such as spacecraft, and celestial objects, such as planets, stars, quasars, and moons emitting detectable electromagnetic energy.

Once the signals are received at step 806, calculation of the "true" phase propagation can be started. First, at step 808 the signal received at a second element is analyzed using an adaptive BSS algorithm to determine $f_{true}$ as previously described. In other embodiments, inter-element phase comparison methods can be used to determine the $f_{true}$ values. However, comparison approaches are typically limited in accuracy. For example, the presence of multiple emitters near an antenna element of interest can result interference. Furthermore, if the antenna elements do not operate identically, such methods fail to capture the effect of such variations on $f_{true}$ without performing some amount of signal processing, which reduces the overall signal power available for determining $f_{true}$. BSS methods, however, are not generally affected by such effects and allow $f_{true}$ values to be obtain without the need for significant filtering that can reduce the signal power available. Concurrently or subsequent to step 808, a configuration of the antenna array, based on calibration data and/or a system model, can be used in step 810 to determine an estimated phase propagation ($n_{model} + f_{model}$) between the first antenna element and the second antenna element. For purposes of method 800, it is assumed that the first antenna element is the reference antenna element. The fractional wavelength portion of the estimate phase propagation ($f_{model}$) can then be determined in step 812.

The estimated phase propagation can then be adjusted in step 814. As previously described, the estimated phase propagation is adjusted by computing $n_{true}$ from $n_{model}$ according to Equations (9) and (10). The adjusted or "true" phase propagation value ($n_{true} + f_{true}$) can then be used in step 816 to compute an actual differential distance ($z_{true}$) between the phase center of the first and second antenna elements. Finally, in step 818, the phase of the transmitted signal can be adjusted using the updated calibration data and/or system model. In particular, for the same AOA $z_{true}$ was calculated for, subsequent transmissions will have a phase component adjustment ($\Delta\phi$) equal to $$e^{-j\frac{2\pi}{\lambda_{Tx}}z_{true}}.$$

The various embodiments of the present invention have been described with the assumption that a single narrowband signal has been received. However, the various embodiments of the present invention are not limited in this regard. In some embodiments, multiple signals can be received along the same central beam. The use of multiple signals allows multiple observations and differential distance calculations to be performed, allowing increased accuracy in the computation of the phase adjustments needed for the antenna elements. Furthermore, in some embodiments, wideband signals can also be utilized. In such embodiments, Frequency-domain analysis synthesis filtering methods can be utilized to divide the wideband signals into a plurality of narrowband ranges. Accordingly, in such embodiments, the number of observations is effectively increased, also increasing the number and accuracy of differential distances calculated. Additionally, such an analysis can be necessary when the error in the location of the antenna elements is greater than one wavelength.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for correcting transmission phasing errors in an plurality of antenna elements, the method comprising:
   receiving at least a first signal having a first frequency at said plurality of antenna elements at an angle of arrival (AOA);
   for at least one of said plurality of antenna elements, identifying an actual fractional wavelength value ($f_{true}$) for the first signal received with respect to a reference location;
   obtaining a estimated phase propagation of the first signal at said one of said plurality of antenna elements relative to the reference location based at least on configuration data for plurality of antenna elements; and
   updating said configuration data associated with said AOA for said one of said plurality of antenna elements based on the estimated phase propagation and $f_{true}$.

2. The method of claim 1, wherein the obtaining comprises:
   calculating the estimated phase propagation by modeling said first signal traversing an estimated differential distance for said one of said plurality of antenna elements relative to said reference location based on the configuration data and the AOA; and
   calculating an estimated fractional wavelength value ($f_{model}$) and an estimated whole wavelength value ($n_{model}$) for the first signal from the estimated phase propagation.

3. The method of claim 2, wherein said updating further comprises:
   estimating an actual whole wavelength value ($n_{true}$) for the first signal based on the estimated phase propagation and $f_{true}$; and
   determining an actual differential distance ($z_{true}$) for the one of said plurality of antenna elements relative to the reference location based on a sum of $f_{true}$ and $n_{true}$.

4. The method of claim 3, further comprising:
   transmitting a second signal having a second frequency ($c/\lambda_{Tx}$) from the one of said plurality of antenna elements at said AOA using a complex weight having a phase correction, wherein said phase correction is $$e^{-j\frac{2\pi}{\lambda_{Tx}}z_{true}}.$$

5. The method of claim 4, further comprising:
   receiving a third signal having a third frequency at the plurality of antenna elements at said AOA; and
   repeating the identifying, the obtaining, the updating, and the transmitting steps based on the third signal.

6. The method of claim 3, wherein said estimating $n_{true}$ further comprises computing an adjusted value of $n_{model}$ ($n_{model\_adjusted}$) for $n_{true}$.

7. The method of claim 6, wherein said computing of $n_{model\_adjusted}$ is performed according to the equation $$n_{model\_adjusted} = \text{floor}\left(\frac{f}{c} \cdot z_{model}\right),$$

where f is a frequency of said first signal, c is the speed of light, and z is the estimated differential distance for said one of said plurality of antenna elements.

8. The method of claim 1, wherein said reference location comprises a location of another of said plurality of antenna elements.

9. The method of claim 1, wherein said identifying further comprises analyzing the first signal at said one of said plurality of antenna elements using an adaptive blind separation signal (BSS).

10. A communications system comprising:
a plurality of antenna elements; and
an array control system communicatively coupled to said plurality of antenna elements, said array control system comprising:
a storage element for storing signal data for at least a first signal having a first frequency received at said plurality of antenna elements at an angle of arrival (AOA) and for storing configuration data for said plurality of antenna elements;
a processing element communicatively coupled to said storage element, said processing element configured for: identifying an actual fractional wavelength value ($f_{true}$) for at least one of said plurality of antenna element for the first signal with respect to a reference location, obtaining a estimated phase propagation of the first signal at said one of said plurality of antenna elements relative to the reference location based at least on configuration data for plurality of antenna elements, and updating said configuration data associated with said AOA for said one of said plurality of antenna elements based on the estimated phase propagation and $f_{true}$.

11. The communications system of claim 10, wherein said processing element is further configured during said obtaining for:
calculating the estimated phase propagation by modeling said first signal traversing an estimated differential distance for said one of said plurality of antenna elements relative to said reference location based on the configuration data and the AOA; and
calculating an estimated fractional wavelength value ($f_{model}$) and an estimated whole wavelength value ($n_{model}$) for the first signal from the estimated phase propagation.

12. The communications system of claim 11, wherein said processing element is further configured during said updating for:
estimating an actual whole wavelength value ($n_{true}$) for the first signal based on the estimated phase propagation and $f_{true}$; and
determining an actual differential distance ($z_{true}$) for the one of said plurality of antenna elements relative to the reference location based on a sum of $f_{true}$ and $n_{true}$.

13. The communications system of claim 12, wherein said processing element is further configured for comprising:
generating control signals for transmitting a second signal having a second frequency ($c/\lambda_{Tx}$) from the one of said plurality of antenna elements at said AOA, said control signals comprising a complex weight having a phase correction for said one of said plurality of antenna elements, wherein said phase correction is $$e^{-j\frac{2\pi}{\lambda_{Tx}}z_{true}}.$$

14. The communications system of claim 13, wherein said storage element further configured for receive signal data for a third signal having a third frequency at the plurality of antenna elements at said AOA, and wherein said processing element is further configured for repeating the identifying, the obtaining, the updating, and the transmitting steps based on the third signal.

15. The communications system of claim 12, wherein said processing element is further configured during said estimating $n_{true}$ for computing an adjusted value of $n_{model}$ ($n_{model\_adjusted}$) for $n_{true}$.

16. The communications system of claim 15, wherein said processing element performs said computing of $n_{model\_adjusted}$ according to the equation $$n_{model\_adjusted} = \text{floor}\left(\frac{f}{c} \cdot z_{model}\right),$$

where f is a frequency of said first signal, c is the speed of light, and z is the estimated differential distance for said one of said plurality of antenna elements.

17. The communications system of claim 10, wherein said reference location comprises a location of another of said plurality of antenna elements.

18. The communications system of claim 10, wherein said processing element is further configured during said identifying for analyzing the first signal at said one of said plurality of antenna elements using an adaptive blind source separation (BSS) algorithm.

19. A computer-readable storage, having stored thereon a computer program for correcting transmission phasing errors in plurality of antenna, the computer program comprising a plurality of code sections for performing the steps of:
receiving signal data for at least a first signal having a first frequency at said plurality of antenna elements at an angle of arrival (AOA);
for at least one of said plurality of antenna elements, identifying an actual fractional wavelength value ($f_{true}$) for the first signal received with respect to a reference location using a blind source separation algorithm;
obtaining a estimated phase propagation of the first signal at said one of said plurality of antenna elements relative to the reference location based at least on configuration data for plurality of antenna elements; and
updating said configuration data associated with said AOA for said one of said plurality of antenna elements based on the estimated phase propagation and $f_{true}$.

20. The computer-readable storage claim 19, wherein said obtaining further comprises code sections for:
calculating the estimated phase propagation by modeling said first signal traversing an estimated differential distance for said one of said plurality of antenna elements relative to said reference location based on the configuration data and the AOA; and
calculating an estimated fractional wavelength value ($f_{model}$) and an estimated whole wavelength value ($n_{model}$) for the first signal from the estimated phase propagation.

21. The computer-readable storage claim 20, wherein said updating further comprises code sections for:
    estimating an actual whole wavelength value ($n_{true}$) for the first signal based on the estimated phase propagation and $f_{true}$; and
    determining an actual differential distance ($z_{true}$) for the one of said plurality of antenna elements relative to the reference location based on a sum of $f_{true}$ and $n_{true}$.

22. The computer-readable storage claim 21, further comprising:
    transmitting a second signal having a second frequency ($c/\lambda_{Tx}$) from the one of said plurality of antenna elements at said AOA using a complex weight having a phase correction, wherein said phase correction is $$e^{-j\frac{2\pi}{\lambda_{Tx}}z_{true}}.$$

23. The computer-readable storage claim 22, further comprising:
    receiving a third signal having a third frequency at the plurality of antenna elements at said AOA; and
    repeating the identifying, the obtaining, the updating, and the transmitting steps based on the third signal.

24. The computer-readable storage claim 20, wherein said estimating $n_{true}$ further comprises computing an adjusted value of $n_{model}$ ($n_{model\_adjusted}$) for $n_{true}$.

25. The computer-readable storage claim 24, wherein said computing of $n_{model\_adjusted}$ is performed according to the equation $$n_{model\_adjusted} = \mathrm{floor}\left(\frac{f}{c} \cdot z_{model}\right),$$

where f is a frequency of said first signal, c is the speed of light, and z is the estimated differential distance for said one of said plurality of antenna elements.

* * * * *